United States Patent
Wu et al.

(10) Patent No.: US 11,085,486 B2
(45) Date of Patent: Aug. 10, 2021

(54) SEAL MEMBER OF BALL JOINT

(71) Applicants: FANUC CORPORATION, Yamanashi (JP); THK CO., LTD., Tokyo (JP)

(72) Inventors: Yunfeng Wu, Minamitsuru-gun (JP); Satoshi Kashiwagura, Tokyo (JP)

(73) Assignees: FANUC CORPORATION, Yamanashi (JP); THK CO., LTD., Tokyo (JP)

( * ) Notice: Subject to any disclaimer, the term of this patent is extended or adjusted under 35 U.S.C. 154(b) by 636 days.

(21) Appl. No.: 15/928,993

(22) Filed: Mar. 22, 2018

(65) Prior Publication Data

US 2018/0283444 A1    Oct. 4, 2018

(30) Foreign Application Priority Data

Mar. 31, 2017  (JP) ............... JP2017-071706

(51) Int. Cl.
 *F16C 11/06*   (2006.01)
(52) U.S. Cl.
 CPC ...... *F16C 11/0676* (2013.01); *F16C 2322/59* (2013.01)
(58) Field of Classification Search
 CPC ... F16C 11/06; F16C 11/0666; F16C 11/0671; F16C 11/0676; F16C 11/0685; F16J 15/3204; Y10T 403/32729
 See application file for complete search history.

(56) References Cited

U.S. PATENT DOCUMENTS

| | | | | |
|---|---|---|---|---|
| 4,902,157 A * | 2/1990 | Ishikawa | .............. | B60S 1/24 |
| | | | | 277/504 |
| 6,688,799 B2 * | 2/2004 | Broker | ............... | F16C 11/0628 |
| | | | | 403/133 |
| 6,941,656 B2 * | 9/2005 | Michioka | ............ | F16C 11/0633 |
| | | | | 29/898.049 |
| 9,056,538 B2 * | 6/2015 | Kuroda | .............. | F16C 11/0695 |
| 9,829,044 B2 * | 11/2017 | Clark | .................. | F16C 11/0671 |
| 2009/0047063 A1 * | 2/2009 | Shirai | ................ | F16C 11/0671 |
| | | | | 403/133 |
| 2012/0248723 A1 * | 10/2012 | Harper | ................ | F16C 33/723 |
| | | | | 280/93.512 |
| 2015/0362019 A1 * | 12/2015 | Polanco | .............. | F16C 11/0614 |
| | | | | 384/146 |

FOREIGN PATENT DOCUMENTS

| | | | | |
|---|---|---|---|---|
| JP | 47-33088 Y1 | 10/1972 | | |
| JP | 49-130279 U | 11/1974 | | |
| JP | 2001-12450 A | 1/2001 | | |
| JP | 2009210070 A | * | 9/2009 | ......... F16C 11/0676 |

* cited by examiner

*Primary Examiner* — Jonathan P Masinick
(74) *Attorney, Agent, or Firm* — Westerman, Hattori, Daniels & Adrian, LLP

(57) ABSTRACT

Provided is a seal member or a ball joint capable of satisfactorily maintaining sealing performance between a ball portion of a ball shank and a ball receiving portion of a holder for a long time even when the ball shank is used under a condition that the ball shank is pivoted repeatedly with respect to the holder at a large pivot angle and at high speed. The seal member includes: a base portion having an annular ring shape and is to be fixed to the holder; a retaining portion formed on an inner peripheral side of the base portion integrally with the base portion and is recessed into a conical shape toward the holder; and a lip portion formed along an inner peripheral edge of the retaining portion so as to be held in sliding contact with a spherical surface of the ball portion of the ball shank.

5 Claims, 4 Drawing Sheets

SEAL MEMBER OF BALL JOINT

TECHNICAL FIELD

The present invention relates to a seal member provided between a holder and a ball shank in a ball joint to be used in various link devices such as link motion mechanisms for industrial robots.

BACKGROUND ART

The ball joint of this type is used in many cases for the purpose of coupling two mechanical elements to each other in a freely pivotable manner, to thereby construct various link devices. In general, the ball joint includes a ball shank and a holder. The ball shank includes a ball portion formed at a distal end of a shank portion thereof. The holder includes a ball receiving portion that holds and covers the ball portion. Under a state in which the ball portion of the ball shank is held in sliding contact with the ball receiving portion of the holder, the ball shank can be freely pivoted with respect to the holder within a certain angle range.

When dust enters a gap between the ball portion of the ball shank and the ball receiving portion of the holder, sliding contact surfaces of the ball shank and the holder are damaged, with the result that a smooth motion of the ball shank with respect to the holder is impaired. Accordingly, in actual use of the ball joint, it is necessary to provide a seal member configured to seal the gap between the ball portion and the ball receiving portion.

As the seal member, there has been known a flexible boot, seal, which is provided between the ball shank and the holder. The boot seal has a substantially tubular shape having opening portions formed in both end thereof. One opening portion of the boot seal allows the shank portion of the ball shank to be inserted therethrough, and is fixed to the shank portion. Another opening portion of the boot seal is fixed to a periphery of the ball receiving portion of the holder. Further, the boot seal is mounted in a state of being bent between the shank portion and the ball receiving portion, and is freely deformable by following pivoting of the ball shank with respect to the holder.

Meanwhile, as another seal member other than the boot seal, a ring-shaped sealing body to be fixed to the holder is disclosed in Japanese Utility Model Application Laid-open No. 130279/1974. The sealing body has a ring shape so as to have an opening portion that allows the shank portion of the ball shank to be inserted therethrough, and an outer peripheral portion of the sealing body is fixed to the ball receiving portion of the holder. Under a state in which the sealing body is fixed to the ball receiving portion, the sealing body is bent by being pushed up by the ball portion of the ball shank, and an inner peripheral edge of the sealing body is held in press-contact with a spherical surface of the ball portion. Accordingly, when the ball shank is pivoted with respect to the holder, the inner peripheral edge of the sealing body is held in sliding contact with the spherical surface of the ball portion without being separated from the spherical surface of the ball portion. In this manner, a gap between the ball portion and the ball receiving portion is sealed.

Of the two above-mentioned seal members, the former boot seal has the opening portions that are formed in both ends thereof, and are fixed to the shank portion of the ball shank and the ball receiving portion of the holder, respectively. Accordingly, the boot seal has a characteristic of being excellent in sealing performance. However, the boot seal is deformed by following pivoting of the ball shank, and hence there arises the following problems. That is, when the ball shank is pivoted repeatedly at high speed, the boot seal is required to have high durability. In addition, when the ball shank is required to pivot at a large angle, it is difficult to apply the boot seal.

Meanwhile, irrespective of pivoting of the ball shank, the latter sealing body having a ring shape is held in press-contact with the spherical surface of the ball portion while keeping a uniform posture. Accordingly, as compared to the boot seal, the sealing body has a characteristic that durability can be ensured more easily. However, the inner peripheral edge of the sealing body is bent by being pushed up by the ball portion of the ball shank, and hence there has been the following fear. That is, when a pivot angle of the ball shank is large, the shank portion of the ball shank and the inner peripheral edge of the sealing body are liable to interfere with each other. Thus, a gap is formed between the ball portion and the sealing body, with the result that sealing performance is impaired.

DISCLOSURE OF THE INVENTION

The present invention has been made to solve the above-mentioned problems, and has an object to provide a seal member of a ball joint capable of satisfactorily maintaining sealing performance between a ball portion of a ball shank and a ball receiving portion of a holder for a long time even when the ball shank is used under a condition that the ball shank is pivoted repeatedly with respect to the holder at a large pivot angle and at high speed.

That is, according to one embodiment of the present invention, provided is a seal member of a ball joint, which is to be used in a ball joint including a ball shank and a holder coupled to each other in a freely pivotable manner, and is configured to seal a gap between a ball portion of the ball shank and the holder of the ball joint, the seal member including: a base portion, which has an annular ring shape, and is to be fixed to the holder; a retaining portion, which is formed on an inner peripheral side of the base portion integrally with the base portion, and is recessed into a conical shape toward the holder; and a lip portion, which is formed along an inner peripheral edge of the retaining portion so as to be held in sliding contact with one of a spherical surface of the ball portion of the ball shank and a neck portion of the ball shank.

The seal member according to one embodiment of the present invention includes the lip portion that is held in sliding contact with the spherical surface of the ball portion of the ball shank, and the lip portion is connected to the base portion having the annular ring shape through the retaining portion that is recessed into a conical shape. Accordingly, the retaining portion forms a space for avoiding interference between the seal member and the shank portion of the ball shank. Thus, even when a pivot angle of the ball shank with respect to the holder is large, a contact state between the lip portion and the spherical surface of the ball portion can be maintained.

Further, the seal member according to one embodiment of the present invention is not deformed by following pivoting of the ball shank. Even when the ball shank is pivoted, the lip portion is merely held in sliding contact with the spherical surface of the ball portion. Accordingly, even when the ball shank is pivoted repeatedly at high speed, an unstable contact state between the lip portion and the ball portion is not caused, and a gap between the ball portion and the holder can be reliably sealed with high durability.

Therefore, even when the ball shank is used under a condition that the ball shank is pivoted with respect to the holder repeatedly at a large pivot angle and at high speed, the seal member of the ball joint according to the present invention can satisfactorily maintain sealing performance between the ball portion of the ball shank and the ball receiving portion of the holder for a long time.

MODE FOR CARRYING OUT OF THE INVENTION

Now, with reference to the accompanying drawings, detailed description is made of a seal member of a ball joint according to the present invention.

Figure 1:
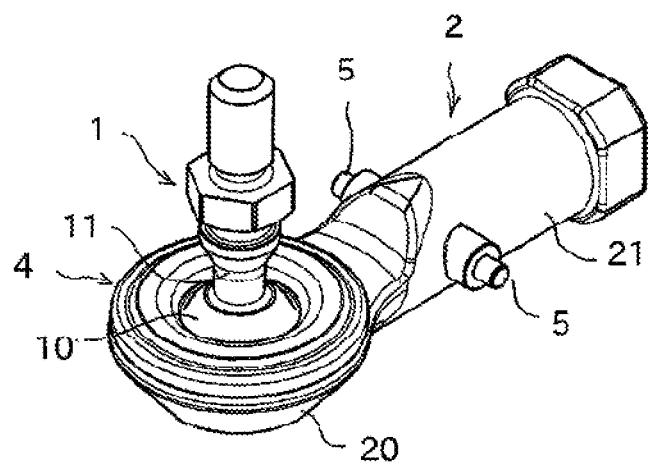
FIG. 1 is a perspective view for illustrating an example of a ball joint to which a seal member according to the present invention is applicable.

FIG. 1 is an illustration of an example of a ball joint to which a seal member according to the present invention is mounted. The ball joint includes a ball shank 1 and a holder 2. The ball shank 1 includes a ball portion 10 formed at a distal end of a shank portion 11. The holder 2 includes a ball receiving portion 20 that holds and covers the ball portion 10.

The ball shank 1 is coupled to the holder 2 in a freely pivotable manner, and the ball portion 10 of the ball shank 1 defines a pivot center of the ball shank 1. Thus, when a first mechanical element and a second mechanical element are fixed respectively to the ball shank 1 and the holder 2, those mechanical elements can be coupled to each other in a freely pivotable manner with the ball portion 10 defining the pivot center. Further, a pivot shaft 5 is provided on the holder 2 so as to extend in a direction orthogonal to a center axis of the ball shank 1. Further, the pivot shaft 5 can be used for coupling a third mechanical element. With this, the holder 2 and the third mechanical element can be coupled to each other in a freely pivotable manner with the pivot shaft 5 defining a second pivot center.

Figure 2:
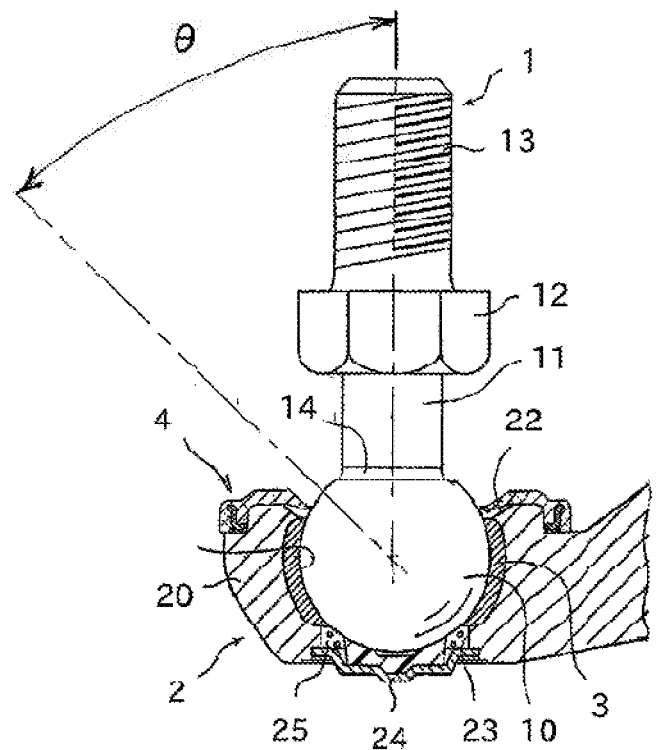
FIG. 2 is a sectional view for illustrating the ball joint of FIG. 1.

FIG. 2 is a sectional view for illustrating a state in which the ball shank 1 and the ball receiving portion 20 of the holder 2 are coupled to each other. The ball shank 1 is formed, for example, through electric resistance welding of the shank portion 11 having a bar shape to a high-sphericity bearing steel ball being the ball portion 10. Alternatively, the ball shank 1 integrally including the ball portion 10 and the shank portion 11 may be formed by plastic working such as cold forging. A flange portion 12 having a bearing surface configured to allow the first mechanical element such as a link member to be fixed thereto is formed on the shank portion 11, and male threads 13 are formed on a side opposite to the ball portion 10 with respect to the flange portion 12. Further, the flange portion 12 has a shape of a hexagonal nut so that the male threads 13 of the ball shank 1 can be fastened to the first mechanical element with a spanner wrench.

A connection portion between the ball portion 10 and the shank portion 11, that, is, a neck portion 14 of the ball shank 1 is processed into a curved surface so that a spherical surface of the ball portion 10 and an outer peripheral surface of the shank portion 11 are smoothly continuous with each other. With this configuration, a lip portion 42 of a seal member 4, which is described later, is held in abutment against a region from the spherical surface of the ball portion 10 of the ball shank 1 to the neck portion 14 without gaps.

A resin sliding contact, member 3 is provided between the ball receiving portion 20 of the holder 2 and the ball portion 10 of the ball shank 1. The resin sliding contact, member 3 has such an annular shape as to cover a maximum diameter portion of the ball portion 10, and covers substantially two thirds of the spherical surface of the ball portion 10. The resin sliding contact member 3 is fixed to the ball receiving portion 20. Thus, when the ball portion 10 is rotated in the resin sliding contact member 3, the ball shank 1 can be freely pivoted with respect to the holder 2.

Meanwhile, the holder 2 includes the ball receiving portion 20 and a fixing portion 21 (see FIG. 1). The ball receiving portion 20 is provided around the resin sliding contact member 3 so as to cover the resin sliding contact member 3. The fixing portion 21 (see FIG. 1) is configured to couple the ball receiving portion 20 to the second mechanical element such as a link member. The ball receiving portion 20 and the fixing portion 21 are integrally molded by die casting of aluminum alloy or zinc alloy. The pivot shaft 5 is a columnar member formed by machining or forging. The pivot shaft 5 is inserted into a die when the holder 2 is molded by die casting, and is integrated with the fixing portion 21 as a result of casting of the holder 2.

The ball receiving portion 20 of the holder 2 is molded into an annular shape on an outside of the resin sliding contact member 3, and has two opening portions 22 and 23. The opening portion 22 on one side defines a pivot range of the ball shank 1, and the opening portion 23 on another side is closed by a closure cap 24. The ball receiving portion 20 is kept out of contact with the ball portion 10 of the ball shank 1. Between the ball receiving portion 20 and the ball portion 10, the resin sliding contact member 3 is slightly exposed in both the opening portions 22 and 23. The opening portion 23 is closed by the closure cap 24, and is used as a grease pool 25.

An inner peripheral surface of the opening portion 22 has such a conical shape as to surround the spherical surface of the ball portion 10. Accordingly, even when a maximum pivot angle θ of the ball shank 1 with respect to the holder 2 is set to a large angle, the shank portion 11 of the ball shank 1 and the ball receiving portion 20 of the holder 2 are less liable to interfere with each other.

Next, a seal member according to a first embodiment of the present invention is described.

The seal member 4 is mounted to the ball receiving portion 20 of the holder 2, and is configured to prevent entry of dust, dirt, and the like into a gap between the ball receiving portion 20 and the ball portion 10 of the ball shank 1. The seal member 4 has a ring shape having a through-hole formed in a center thereof. As illustrated in FIG. 1 and FIG. 2, the shank portion 11 of the ball shank 1 is inserted through the through-hole. The seal member 4 is fixed to the ball receiving portion 20 so as to cover the opening portion 22 of the ball receiving portion 20. Meanwhile, an inner peripheral edge of the through-hole is held in contact with the spherical surface of the ball portion 10 of the ball shank 1.

Figure 3:
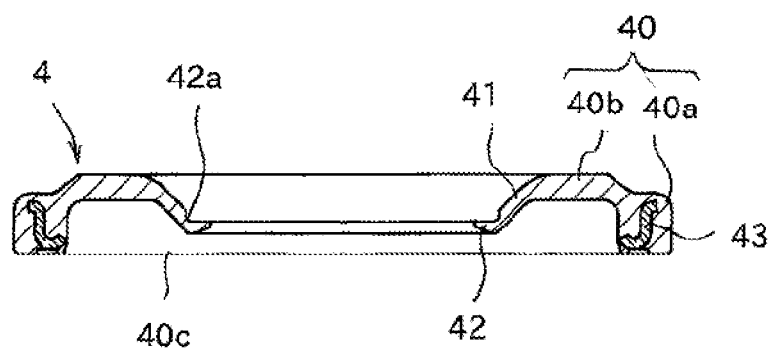
FIG. 3 is a sectional view for illustrating a seal Member according to a first embodiment of the present invention.
Figure 4:
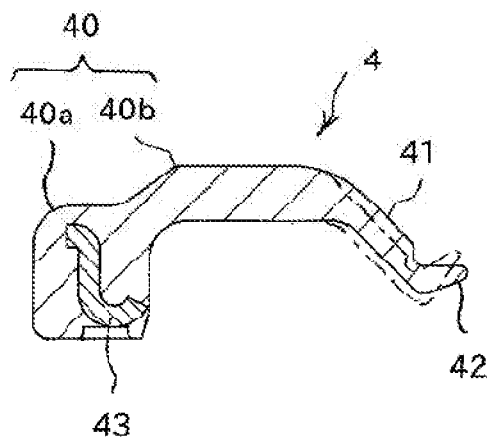
FIG. 4 is an enlarged sectional view for illustrating a main part of the seal member according to the first embodiment.

FIG. 3 is a sectional view for illustrating the seal member 4 taken at a diameter position thereof. FIG. 4 is an enlarged sectional view for illustrating the seal member 4 taken along a radial direction thereof. The seal member 4 includes a base portion 40, a retaining portion 41, and a lip portion 42. The base portion 40 has an annular ring shape and is to be fixed to an outer peripheral edge of the ball receiving portion 20. The retaining portion 41 extends from the base portion 40 to a radially inner side of the base portion 40. The lip portion 42 is formed along an inner peripheral edge of the retaining portion 41 so as to be held in abutment against the spherical surface of the ball portion 10 of the ball shank 1. The seal member is made of, for example, hydrogenated nitrile rubber.

The base portion 40 includes a locking portion 40a and a flange portion 40b. The annular locking portion 40a has an annular shape and is to be fixed to the ball receiving portion 20 of the holder 2. The flange portion 40b extends from the locking portion 40a to a radially inner side of the locking portion 40a. The locking portion 40a has a substantially rectangular sectional shape. When the seal member 4 is mounted onto the holder 2, the seal member 4 is pushed into an annular groove formed in the ball receiving portion 20 of the holder 2, and is fixed to the holder 2 so as to fasten the ball receiving portion 20 from an outer side of the holder 2. Further, a retaining ring 43 made of metal or synthetic resin is embedded in the locking portion 40a, and the retaining ring 43 intensifies a force of fastening the holder 2 by the base portion 40. Thus, the seal member 4 is reliably fixed in the annular groove of the ball receiving portion 20.

The flange portion 40b has a plate-like shape, and is formed integrally with the locking portion 40a on the radially inner side of the locking portion 40a. The flange portion 40b extends from a corner portion of the locking portion 40a, which has a rectangular sectional shape, so as to prevent the flange portion 40b and the ball receiving portion 20 from interfering with each other when the locking portion 40a is pushed into the annular groove of the ball receiving portion 20. The flange portion 40b is positioned so as to cover the ball receiving portion 20 when the seal member 4 is mounted onto the holder 2. Further, the flange portion 40b functions to support the retaining portion 41 with respect to the locking portion 40a in a cantilever state. Therefore, the flange portion 40b is not fixed to the ball receiving portion 20 of the holder 2.

A design change may be made to a radial length of the flange portion 40b as appropriate in accordance with a position of fixing the locking portion 40a to the ball receiving portion 20. For example, without forming the flange portion 40b, the retaining portion 41 to be described later can be formed on the locking portion 40a.

Meanwhile, the retaining portion 41 has a conical shape, and is recessed toward a base surface 40c of the locking portion 40a. The retaining portion is formed integrally with, the flange portion 40b on the radially inner side of the flange portion. 40b. When the seal member 4 is mounted onto the holder 2, the retaining portion 41 having a conical shape is positioned along the inner peripheral surface of the opening portion 22 formed in the ball receiving portion 20. When the ball shank 1 is inclined at the maximum pivot angle θ, the retaining portion 41 is positioned between the shank portion 11 of the ball shank 1 and the opening portion 22 of the ball receiving portion 20. The retaining portion 41 has a thickness smaller than a thickness of the flange portion 40b. When an external force is received, the retaining portion 41 is bent more easily than the flange portion 40b.

Further, the lip portion 42 is formed along the inner peripheral edge of the retaining portion 41, and defines an inner diameter of the seal member 4 formed into a ring shape. The inner diameter of the seal member 4 defined by the lip portion 42 is set to be larger than a shank diameter of a distal end of the shank portion 11 connected to the ball portion 10, and the lip portion 42 is held in contact with the spherical surface of the ball portion 10. The lip portion 42 has such a tapered shape that a thickness of the lip portion 42 decreases toward a distal end thereof. In a state of being kept out of contact with the ball portion 10, the lip portion 42 extends from the retaining portion 41 toward a center of the seal member 4 so as to decrease the inner diameter of the seal member 4. Further, the lip portion 42 having a tapered shape is provided so as not to extend straight toward the center of the seal member 4, but to extend so that a distal end portion of the lip portion 42 is directed slightly upward. Accordingly, the lip portion 42 is held in contact with the spherical surface of the ball portion 10 obliquely, and held in contact with the spherical surface of the ball portion with high surface pressure while being slightly bent.

Further, a coupling portion 42a is formed at an interface between the lip portion 42 and the retaining portion 41. The coupling portion 42a is has a thickness smaller than a thickness of each of the lip portion 42 and the retaining portion 41. With this configuration, the lip portion 42 can be deformed flexibly with respect to the retaining portion 41. Accordingly, as indicated by the alternate long and short dash line in FIG. 4, at the time of application of the external force of pressing the distal end of the lip portion 42, the lip portion 42 and the retaining portion 41 are elastically deformed. Thus, the lip portion 42 can be reliably held in contact with the spherical surface of the ball portion 10 with suitable contact pressure.

Figure 5:
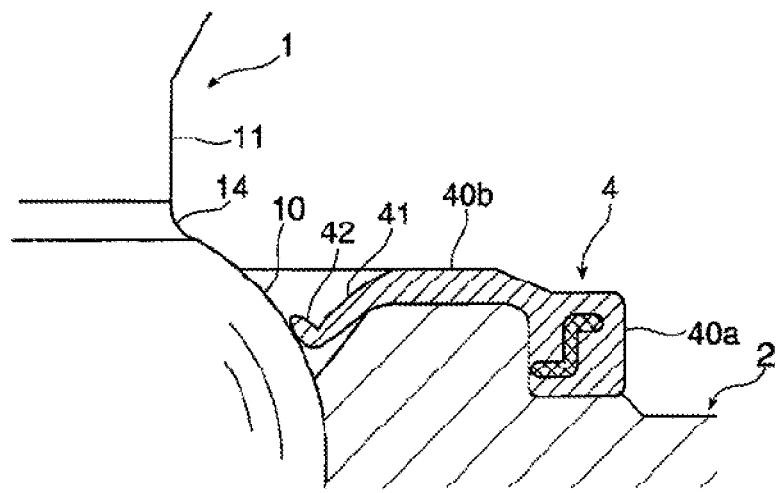
FIG. 5 is an enlarged sectional view for illustrating a behavior of the seal member when a ball shank is positioned in a vicinity of a center of a pivot range.
Figure 6:
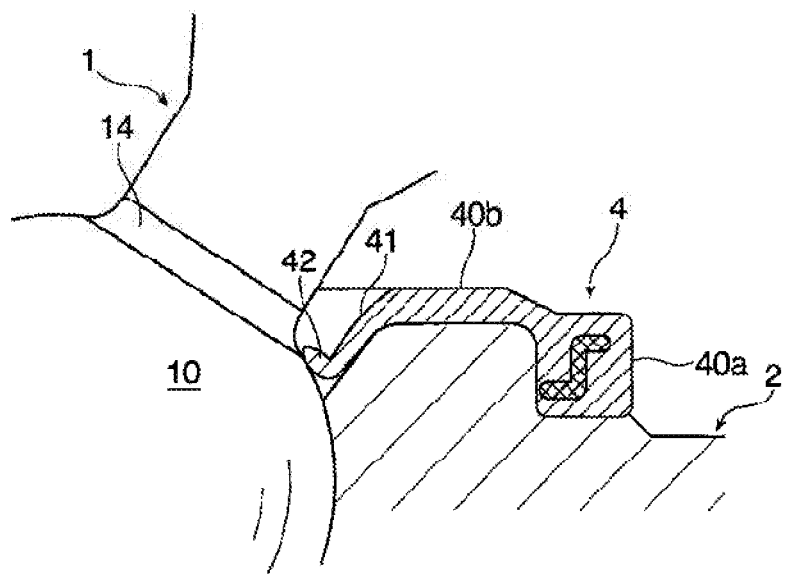
FIG. 6 is an enlarged sectional view for illustrating a behavior of the seal member when the ball shank is inclined at a maximum pivot angle.

FIG. 5 and FIG. 6 are illustrations of behaviors of the seal member 4 with respect to the spherical surface of the ball portion 10. FIG. 5 is an illustration of a case in which the ball shank 1 is positioned in a vicinity of a center of a pivot range. FIG. 6 is an illustration of a case in which the ball shank 1 is inclined at the maximum pivot angle θ.

When the ball shank 1 is positioned in the vicinity of the center of the pivot range, as illustrated in FIG. 5, the lip portion 42 of the seal member 4 is held in contact with the spherical surface of the ball portion 10 of the ball shank 1. The ball portion 10 is a spherical body having a high sphericity. Accordingly, at any position of the seal member 4 in the circumferential direction, the lip portion 42 is held in contact with the spherical surface of the ball portion 10 in the same manner. At this time, there is a gap between the retaining portion 41 of the seal member 4 and the inner peripheral surface of the opening portion 22 of the ball receiving portion 20. Even when the ball shank 1 is pivoted with respect to the holder 2 from this state, the ball portion 10 of the ball shank 1 is merely rotated in the ball receiving portion 20 of the holder 2, and a positional relationship between the lip portion 42 of the seal member 4 and the ball portion 10 does not change. Accordingly, even when the ball shank 1 is pivoted repeatedly at high speed, the lip portion 42 is stably kept in sliding contact with the spherical surface of the ball portion 10, and the ball portion 10 and the lip portion 42 are not kept out of contact with each other.

Further, when the ball shank 1 is inclined with respect to the holder 2 at the maximum pivot angle θ, as illustrated in FIG. 6, the lip portion 42 of the seal member 4 reaches the connection portion between the ball portion 10 and the shank portion 11 of the ball shank 1, that is, the neck portion 14 of the ball shank 1. At this time, the lip portion 42 is pressed by the neck portion 14 of the ball shank 1. However, the retaining portion 41 of the seal member 4 is bent by receiving the pressing force of the neck portion 14, and the lip portion 42 is flexibly deformed with respect to the retaining portion 41. Accordingly, at any position of the seal member 4 in the circumferential direction, the lip portion 42 is kept in contact with the spherical surface of the ball shank 1 or the neck portion of the ball shank 1, and the lip portion 42 is not kept out of contact with the ball portion 10.

Therefore, even when the ball shank 1 is used under a condition that the ball shank 1 is pivoted with respect to the holder 2 repeatedly at a large pivot angle and at high speed, the seal member 4 can satisfactorily maintain sealing performance between the ball portion 10 of the ball shank 1 and the ball receiving portion 20 of the holder 2 for a long time.

Figure 7:
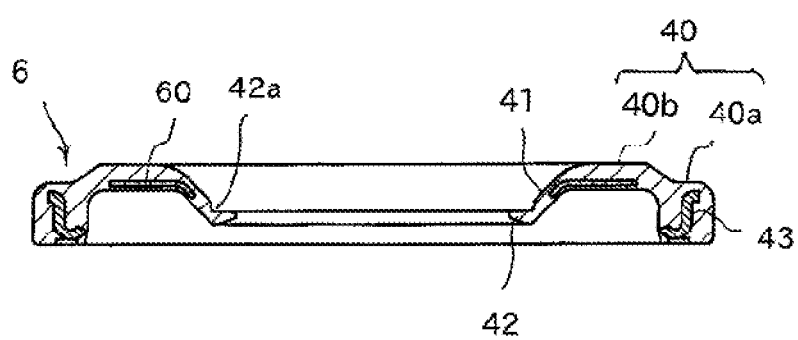
FIG. 7 is a sectional view for illustrating a seal member according to a second embodiment of the present invention.

FIG. 7 is a sectional view for illustrating a seal member according to a second embodiment of the present invention.

A seal member 6 according to the second embodiment has substantially the same configuration as that of the above-mentioned seal member 4 according to the first embodiment. However, the seal member 6 according to the second embodiment is different from the seal member 4 according to the first embodiment in that a reinforcing member 60 having a ring shape is embedded in the flange portion 40b and the retaining portion. Components other than the reinforcing member 60 are the same as the components of the first embodiment described above, and hence are denoted in FIG. 7 by the same reference symbols as those of the first embodiment. Here, detailed description of the components other than the reinforcing member 60 is omitted.

The reinforcing member 60 is provided in a connection portion, between the flange portion 40b and the retaining portion 41, and a radially-inner-side end portion of the reinforcing member 60 is bent in conformity with a conical shape of the retaining portion 41. Accordingly, a degree of deformation of the retaining portion 41 with respect to the flange portion 40b is reduced as compared to that of the seal member 4 according to the first embodiment. The reinforcing member 60 can be made of, for example, metal or synthetic resin.

In the seal member 6 according to the second embodiment, the reinforcing member 60 moderates the degree of deformation of the retaining portion 41 with respect to the flange portion 40b. As a result, the contact pressure of the lip portion with the spherical surface of the ball portion is increased as compared to that in the first embodiment described above. Along with the increase in contact pressure, the lip portion can be more reliably held in sliding contact with the spherical surface of the ball portion. Therefore, also in the seal member 6, even when the ball shank 1 is used under a condition that the ball shank 1 is pivoted with respect to the holder 2 repeatedly at a large pivot angle and at high speed, the sealing performance between the ball portion 10 of the ball shank 1 and the ball receiving portion 20 of the holder 2 can be satisfactorily maintained.

The invention claimed is:

1. A seal member of a ball joint, which is to be used in a ball joint including a ball shank and a holder coupled to each other in a freely pivotable manner, and is configured to seal a gap between a ball portion of the ball shank and a ball receiving portion of the holder, the seal member comprising:
a locking portion, which has an annular ring shape, and fixed to the holder by being fastened to a radially outer peripheral edge of the ball receiving portion;
a flange portion having a plate like annular shape formed on a radially inner side of the locking portion integrally with the locking portion, and extending from the locking portion and covering an axially outermost to surface of the ball receiving portion;
a retaining portion having a thickness smaller than a thickness of the flange portion, the retaining portion being formed on an inner peripheral side of the flange portion integrally with the flange portion, and is recessed into a conical shape toward the holder; and
a lip portion, which is formed along an inner peripheral edge of the retaining portion so as to be held in sliding contact with a spherical surface of the ball portion of the ball shank.

2. The seal member of a ball joint according to claim 1, wherein the lip portion extends from the retaining portion toward a center of the seal member so as to decrease an inner diameter of the seal member.

3. The seal member of a ball joint according to claim 1, further comprising a coupling portion, which is formed between the retaining portion and the lip portion, and has a thickness smaller than a thickness of each of the retaining portion and the lip portion.

4. The seal member of a ball joint according to claim 1, further comprising a reinforcing member, which has a disc shape and is provided in a connection portion between the flange portion and the retaining portion.

5. A ball joint, comprising: a ball shank, which includes a ball portion formed at a distal end of a shank portion thereof, a holder having a ball receiving portion, which is coupled to the ball portion of the ball shank so as to allow the ball shank to be freely pivotable; and a seal member, which is configured to seal a gap between the ball receiving portion of the holder and the ball portion of the ball shank, the seal member including:
a locking portion, which has an annular ring shape, and fixed to the holder by being fastened to a radially outer peripheral edge of the ball receiving portion;
a flange portion having a plate like annular shape formed on a radially inner side of the locking portion integrally with the locking portion, and extending from the locking portion and covering an axially outermost top surface of the ball receiving portion;
a retaining portion having a thickness smaller than a thickness of the flange portion, the retaining portion being formed on an inner peripheral side of the flange portion integrally with the flange portion, and is recessed into a conical shape toward the holder; and
a lip portion, which is formed along an inner peripheral edge of the retaining portion so as to be held in sliding contact with a spherical surface of the ball portion of the ball shank.

* * * * *